United States Patent

[11] 3,594,567

[72] Inventor Dennis Joseph Holmes
 Hall Green, England
[21] Appl. No. 833,919
[22] Filed June 17, 1969
[45] Patented July 20, 1971
[73] Assignee Joseph Lucas (Industries) Limited
 Birmingham, England
[32] Priority June 28, 1968
[33] Great Britain
[31] 30903/68

[54] VEHICLE LAMPS
 2 Claims, 1 Drawing Fig.
[52] U.S. Cl. .................................................. 240/8.16,
 240/7.1, 240/57
[51] Int. Cl. .......................................................... B60g 3/04
[50] Field of Search............................................ 240/7.1,
 8.16, 52.1, 59, 2, 7.35; 340/381; 116/129

[56] References Cited
UNITED STATES PATENTS

| | | | |
|---|---|---|---|
| 2,263,061 | 11/1941 | Allen............................ | 240/7.1 |
| 2,809,283 | 10/1957 | Spencer........................ | 240/7.1 |
| 2,903,570 | 9/1959 | Worden........................ | 240/7.1 |
| 3,225,189 | 12/1965 | Pendell......................... | 240/7.1 X |
| 3,286,255 | 11/1966 | Sanchez........................ | 240/8.16 X |

Primary Examiner—Louis J. Capozi
Attorney—Holman & Stern

ABSTRACT: A vehicle lamp includes a flexible cup-shaped body which supports a bulb and has an outwardly directed flange at its open end. Engageable with the body is a relatively rigid lens member including a portion received as a close fit within the body. The body is inserted through a hole in a panel, with the flange engaged with one face of the panel. The lens member is then engaged with the body and deforms said portion of the lens member to retain the lamp in position.

PATENTED JUL20 1971
3,594,567
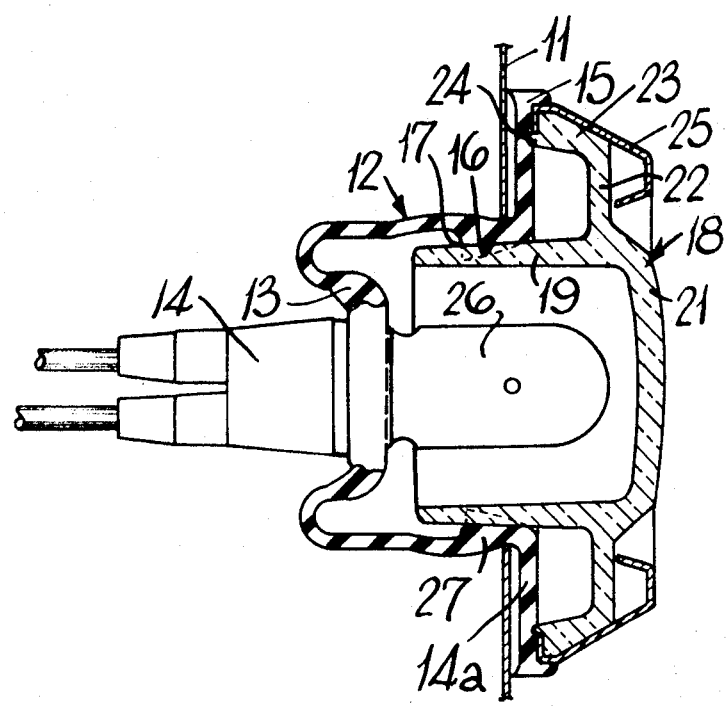
INVENTOR
Dennis Joseph Holmes.
BY Holman, Glascock,
Downing + Seebold
ATTORNEYS

VEHICLE LAMPS

This invention relates to vehicle lamps.

A lamp according to the invention includes a flexible cup-shaped body adapted to support a bulb and having an outwardly directed flange at its open end, and a relatively rigid lens member engageable with the body and including a portion which is received as a close fit within said body, the arrangement being such that in use said body is inserted through a hole in a panel so that said flange is engaged with one face of the panel and said lens member is engaged with the body, said portion of said lens member deforming a part of the wall of said body into engagement with the other face of the panel to retain the lamp in position on the panel.

One example of the invention is illustrated in the accompanying drawing, which is a part-sectional view of a lamp mounted on a panel member.

The lamp is adapted to be mounted on a panel 11, which may, for example, be a wing panel of a road vehicle. The lamp includes a moulded, substantially cup-shaped, rubber body 12, the base 13 of which includes an integral, capless, bulb holder 14. At its open end the body 12 is formed with an integral, outwardly directed, peripheral flange 14a the outer peripheral edge of which includes a circumferentially extending rib 15. The inner diameter of the body 12 decreases from a maximum at the open end of the body 12, to a minimum part way between the open end of the body 12 and the base 13, so that at its open end the body 12 includes an internal frustoconical surface 16 terminating in an internal shoulder 17. The surface 16 is deformed when the lamp is assembled, but its normal position is shown in dotted lines.

The lamp further includes a moulded, relatively rigid lens member 18 in the form of a hollow right cylinder 19 closed at one end by an integral wall 21. The lens member 18 further includes, at its closed end, an outwardly directed peripheral flange 22 which terminates in a portion 23 generally coaxial with the cylinder 19. The portion 23 includes at its free end, a circumferential rib 24, and engaged with the portion 23 and the flange 22 is an annular, decorative metal bezel 25. The outer diameter of the cylinder 19 is substantially equal to the maximum inner diameter of the body 12, and the outer diameter of the bezel 25 is substantially equal to the diameter of the rib 15 on the flange 14a.

In order to mount the lamp on the panel 11, the panel 11 is formed with a circular hole the diameter of which is substantially equal to the outer diameter of the body 12. A capless bulb 26 is engaged in the bulb holder 14, so that the bulb 26 is located within the confines of the body 12, and the body 12 is then inserted through the hole 11a in the panel 11, so that the flange 14a of the body 12 engages the outer surface of the panel 11. The cylindrical portion 19 of the lens member 18 is then inserted into the body 12, and is urged into the body 12 until the rib 24 engages the flange 14a. Insertion of the cylindrical portion 19 of the lens member 18 deforms the surface 16 outwardly to form a bulge 27 at the rear of the panel 11. Thus when the lens member 18 is engaged with the body 12, the body 12 is held against movement relative to the panel 11 by the flange 14a and the bulge 27. Moreover, since the cylindrical portion 19 is a close fit within the body 12, friction between the body 12 and the cylindrical portion 19 maintains the lens member 18 engaged with the body 12.

The rib 15 engages the outer surface of the bezel 25, and the rib 24 bites into the flange 14a the rib 15 and the rib 24 thereby providing a watertight seal between the body 12 and the lens member 18.

It will be appreciated that the body 12 and lens member 18 need not be circular in cross section, and moreover the bulge 27 need not extend completely around the body 12, but could be defined at two or more equiangularly spaced points around the circumference of the body 12.

If desired a reflector can be positioned within the body 12 behind the bulb 26.

Having thus described my invention what I claim as new and desire to secure by Letters Patent is:

1. A vehicle lamp including a flexible cup-shaped body adapted to support a bulb and having an outwardly directed flange at its open end, and a relatively rigid lens member engageable with the body and including a portion which is received as a close fit within said body, the arrangement being such that in use said body is inserted through a hole in a panel so that said flange is engaged with one face of the panel and said lens member is engaged with the body, said portion of said lens member deforming a part of the wall of said body into engagement with the other face of the panel to retain the lamp in position on the panel.

2. A lamp as claimed in claim 1 in which said part of the wall of the body is frustoconical.